(No Model.)
A. WOLFF.
COMBINED FLOUR BIN AND SIEVE.
No. 473,543. Patented Apr. 26, 1892.
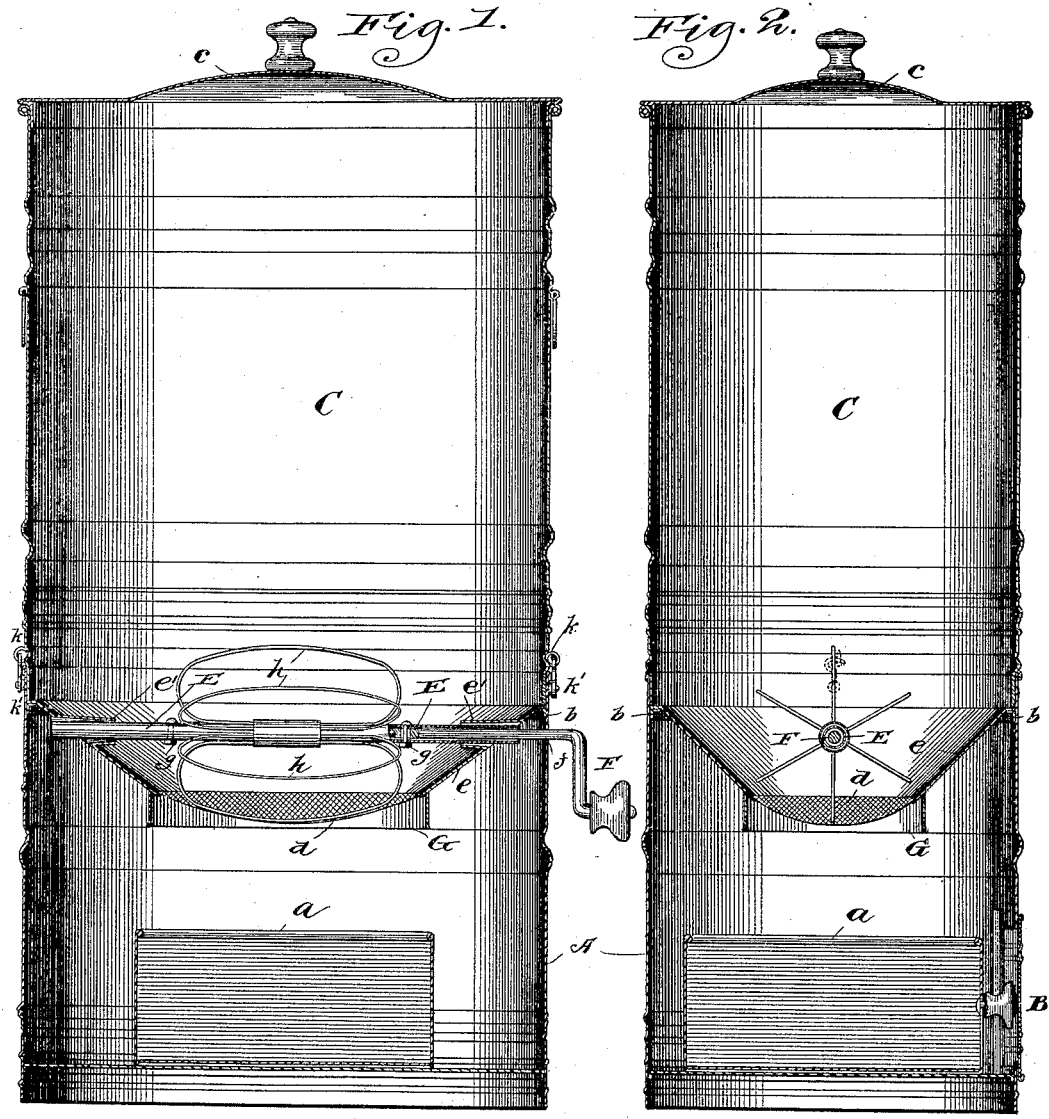

UNITED STATES PATENT OFFICE.

ABRAHAM WOLFF, OF CHICAGO, ILLINOIS.

COMBINED FLOUR BIN AND SIEVE.

SPECIFICATION forming part of Letters Patent No. 473,543, dated April 26, 1892.

Application filed February 24, 1891. Serial No. 382,398. (No model.)

*To all whom it may concern:*

Be it known that I, ABRAHAM WOLFF, residing at Chicago, Cook county, Illinois, have invented certain new and useful Improvements in a Combined Flour Bin and Sieve, of which the following is a full, clear, and exact description, reference being had to the accompanying drawings, and to the letters of reference marked thereon.
The object of my invention is to provide a complete, simple, and economically-constructed flour bin and sieve, which, because of its more perfect construction, is cleaner, does not contaminate or injure the flour by bringing in contact therewith metals liable to rust, is not liable to get out of order, and is more conveniently manipulated than contrivances for the same purpose now on the market, substantially as hereinafter fully described, and as illustrated in the drawings, in which—

Figure 1 is a vertical section taken centrally through my invention from front to rear, and Fig. 2 is a transverse vertical central section therethrough.
My invention consists of an upper and lower part. The lower part or sub-chamber A consists of a cylindrical, elliptical, or other shaped casing, which has a suitable floor or bottom and has a door B in its front for convenient access to the receptacle under the sieve when the upper part or bin C is in position.

Instead of having a drawer which is pulled in and out when it is desired to remove the sifted flour from the sub-chamber of my invention similar to those heretofore existing, I have an independent pan *a*, which is placed in this sub-chamber under the sieve and which can only be removed therefrom by opening the door B. The advantage of this is apparent when it is considered that sometimes in the course of culinary operations the receptacle holding the sifted flour is kept out of the sub-chamber for a considerable length of time, and if this receptacle was a drawer it would leave the sub-chamber open, so that the under part of the sieve would be affected by the humid atmosphere of the kitchen and become more or less clogged by reason thereof, and the floating dust and dirt would settle in the sub-chamber and render unclean the floating particles of flour which might settle on the bottom thereof outside of the receptacle and become unfit for use. The shell of the lower part of my invention extends about ten to twelve inches high, and is provided on its inner surface, within about an inch of the upper edge thereof, with a ledge made by a separate angle-iron ring *b*, which is bolted, riveted, or otherwise secured thereto. I prefer to use bolts to secure this ring in place, because these can be inserted through holes already made in the shell and in the ring in register with each other and can be more quickly secured in place than if riveting or soldering were resorted to.

The bin C is of the same exterior configuration as the lower part of my invention, and its height is regulated by the measure or quantity of flour it is desired to hold. It is placed upon the sub-chamber, its lower edges coming within the upper edges of said sub-chamber and resting on the ledges made by the angle-iron ring *b*. Its top is covered by a suitable lid *c* and its bottom is inclined from its sides to its center. The center of the bottom of the bin is composed of a concave sieve *d* and the margin thereof is made of tin, preferably, which provides an incline *e*, down which the flour gravitates into said sieve.

E represents a hollow tin (preferably) sleeve, which has its ends journaled in and extending through the bearings *e' e'*, which latter are made by tin tubes of suitable diameter suitably secured to the marginal incline *e* and extending inward toward each other in alignment with the openings in said incline, through which the said sleeve passes. This sleeve is placed horizontally and transversely in the bottom of the bin and passes centrally over the sieve *d*. Its length is such that its ends approach quite near the shell of the sub-chamber, and it is in alignment with a suitable opening *f* in one side of the said sub-chamber, through which the transverse shaft F is inserted and passes. This transverse shaft is of a length corresponding to the width of the sub-chamber, and it has one end formed into a suitable crank. It is inserted in place after the bin is placed on the sub-chamber. Its straight end is inserted through opening *f* and through the sleeve, and said sleeve is secured to the shaft by means of transverse bolts or screws $g$ $g$ passing through both. The sleeve is provided with suitable wire wings or brushes $h$ $h$, the shape and curvature of which is such that when said sleeve is revolved by turning the projecting crank-shaped end of the shaft F said brushes sweep over and against the upper surface of the sieve $d$.

Projecting down from the under surface of the bottom of the bin at about the point where the edges of the sieve connect to the incline $e$, so as to surround said sieve, is an apron or skirt G, the vertical drop of which is such as to direct the discharge of the sieve into the pan $a$ and prevent the flour from scattering over the floor or bottom of the sub-chamber.

In order to secure the bin upon the sub-chamber in such a manner that it may be securely held therein when in use or easily removed therefrom when desired, I do not fasten the two parts together by bolts, as has heretofore been the case, but I provide the lower part of the shell of the bin, near the lower edges thereof, with eyes $k$ $k$ and provide the upper part of the shell of the sub-chamber, near the upper edges thereof, with hooks or dogs $k'$ $k'$, which are located with reference to the location of one of the said eyes and engage therewith.

What I claim as new is—

1. A flour-bin having the margin of its bottom inclined downward toward the center and having tubular bearings therein at points diametrically opposite and in register with each other, a concave sieve in the center of the said bottom, a downwardly-projecting skirt surrounding said sieve, a hollow shaft or sleeve journaled in said bearings, and a transverse shaft passing longitudinally through said sleeve of such length that it can extend beyond the sides of the bin, where it is provided with a crank with which to turn it, and agitators projecting therefrom, in combination with a sub-chamber placed under said bin, an angle-iron secured to the inner surface of the shelf thereof, upon which the edges of said bin rest, and a suitable flour-receptacle therein, as set forth.

2. A flour-bin having the margin of its bottom inclined downward toward its center, having tubular bearings at points diametrically opposite and in register with each other, a concave sieve in the center of said bottom, downwardly-projecting skirts surrounding said sieve, and a hollow shaft or sleeve journaled in said bearings, in combination with a sub-chamber placed under and surrounding said bin, having an opening in its side in transverse register with the bearings in the inclined margin of the bottom of the bin, an angle-iron secured to the inner surface of the shelf thereof, upon which the lower edges of the said bin rest, a transverse shaft which is inserted through said opening and passes longitudinally through and is secured to said sleeve and is of such length that its outer end is formed into a crank, and a suitable flour-receptacle in said sub-chamber, as set forth.

ABRAHAM WOLFF.

Witnesses:
BEN BENJAMIN,
F. D. THOMASON.